United States Patent [19]

Sadlowski et al.

[11] Patent Number: 5,115,085

[45] Date of Patent: May 19, 1992

[54] PROCESS FOR THE PREPARATION OF POLYESTER RESIN

[75] Inventors: Jürgen Sadlowski, Münster; Manfred Dangschat, Drensteinfurt; Horst Diefenbach, Nottuln; Theo Laser, Münster; Deiter Schmitt, Weisenheim, all of Fed. Rep. of Germany

[73] Assignee: Max-BASF Lacke+Farben Aktiengesellschaft[DE/DE], Munster, Fed. Rep. of Germany

[21] Appl. No.: 598,610

[22] PCT Filed: Feb. 22, 1989

[86] PCT No.: PCT/EP89/00162

§ 371 Date: Nov. 15, 1990

§ 102(e) Date: Nov. 15, 1990

[87] PCT Pub. No.: WO89/09794

PCT Pub. Date: Oct. 19, 1989

[30] Foreign Application Priority Data

Apr. 14, 1988 [DE] Fed. Rep. of Germany ....... 3812366

[51] Int. Cl.⁵ .............................................. C08G 63/78
[52] U.S. Cl. ................................. 528/272; 528/308; 528/308.5
[58] Field of Search .................... 528/272, 308, 308.5

[56] References Cited

U.S. PATENT DOCUMENTS 3,039,980 6/1962 Mallison ............................... 427/30

FOREIGN PATENT DOCUMENTS 2302778 10/1976 France.

OTHER PUBLICATIONS

Chem. Abstracts, vol. 81, No. 6, 12; Aug. 1974 (Columbus, Ohio) (Kanelafuchi Spinning Co. Ltd-Abstract #26194).

Chem. Abstracts, vol.98, No. 20, 16 May 1982 (Columbus, Ohio, U.S.), Abstract #161746$_m$YCS, A, 203350 (Leser F. et al); Oct. 15, 1982.

International Polymer Science & Term (Rapra), vol. 12, No. 4 1985 (Shawbury, Shrewbury, GB) F. Leser: "Equipment".

Primary Examiner—John Kight, III.
Assistant Examiner—Sam A. Acquah

[57] ABSTRACT

The invention relates to a process for the preparation of polyester and alkyd resins from bifunctional and/or polyfunctional carboxylic acids and/or derivatives thereof and from bifunctional and/or polyfunctional alcohols. The reaction is carried out in stirred kettle reactors which are operated discontinuously and equipped with rectifying columns. During the entire reaction an entraining agent is introduced into the reaction mixture below surface level, with thorough distribution, by means of a delivery device in order to improve the transport of the products of the condensation reaction. In addition, the condensation reaction is carried out under an absolute pressure of 1.5 to 10 bar at least until the maximum reaction rate has been reached. The pressure is then reduced to atmospheric pressue at a gradient of −0.05 bar/hour to −5 bar/hour in a second reaction phase. The reaction is continued under normal pressure until the product exhibits the desired properties. The reaction temperature is between 180 and 320° C.

The process times, in particular, are shortened as a result of this process, and the process products, which are exposed to heat for a correspondingly shorter time, are distinguished by imprved properties.

7 Claims, No Drawings

PROCESS FOR THE PREPARATION OF POLYESTER RESIN

The present invention relates to a process for the preparation of polyester and alkyd resins formed from bifunctional and/or polyfunctional carboxylic acids and/or carboxylic anhydrides and/or carboxylic acid esters and from bifunctional and/or polyfunctional alcohols, in which the reaction is carried out with the application of pressure in stirred kettle reactors which are operated discontinuously and equipped with rectifying columns.

Saturated and unsaturated polyesters and alkyds are used, in particular, in crosslinking systems in the paint resin sector and for the preparation of thermosetting resins. They are preferably prepared in discontinuously operated stirred kettle reactors which can be employed for all-purpose use. These stirred kettle reactors are usually equipped with a device for removing water from the system, comprising a vapor pipe, a condenser and a separation vessel (cf. Ullmann's Encyclopedia of Industrial Chemistry, 5th Edition, Volume A1, Alkyds, Verlag Chemie, Weinheim 1985, pages 415–416).

For carrying out condensation reactions—particularly on a large scale—this reactor set-up has a number of disadvantages:

Owing to losses in feedstock, which are difficult to monitor, the use of a simple vapor pipe without fractionating action as a vapor outlet from the reactor results in displacements in the stoichiometric composition and hence in variations in the quality of the product. In order to improve the manner in which the reaction is carried out rectifying columns have been suggested as a replacement for the simple vapor pipe.

From the aspect of mass transfer the unmodified stirred kettle reactor has a very unfavorable geometry. A decisive factor for the performance of the reactor is the speed at which the component liberated in the course of the polyester condensation (water and alcohol), hereinafter also described as the condensation component, is removed from the polyester melt and the reactor. As the size of the reactor increases there is a diminishment in the specific mass transfer area, which is a co-determining factor in this regard.

In order to improve the transport of the condensation component from the reactor an entraining agent which is not miscible with the condensation component, such as, for example, xylene or toluene, is frequently employed. The state of the art is to pour this entraining agent onto the surface of the resin melt (Ullmann's Encyclopedia of Industrial Chemistry, 5th Edition, Volume A1, page 415).

In order to assist the expulsion of the condensation component from the polyester melt - above all as the viscosity of the melt increases towards the end of the condensation reaction—it is also possible to pass a stream of inert gas (nitrogen, carbon dioxide or argon) through or over the melt, with vigorous stirring (cf. Kunststoff—Handbuch ("Manual of Plastics"), Volume VIII, Polyesters, Hanser Verlag, Munich 1973, pages 266-269). For economic reasons, however, this process is only suitable in exceptional cases.

The esterification of terephthalic acid with glycols under pressure and at an elevated temperature is described in French Patent Specification 1,140,847. Apart from the description of the known esterification reaction, accelerated at an elevated temperature, and the suppression of the formation of byproducts (tetrahydrofuran from 1,4butanediol), the patent specification does not supply any teaching to solve the present problem of the discontinuous preparation of polyesters in stirred kettle reactors, in particular any reference to the use of an entraining agent.

The use of pressure, in order to reduce the production of undesired byproducts, is known from the transesterification of dimethyl terephthalate (cf., for example, German Offenlegungsschrift 2,365,934). Thus, for example, the transesterification of dimethyl terephthalate with ethylene glycol under pressure using a reaction column is suggested in Austrian Patent Specification 242,122, with the aim of reducing the undesired formation of diethylene glycol. German Auslegeschrift 1,130,433 describes a process for the preparation of glycol esters of terephthalic acid in which the transesterification of alkyl esters of terephthalic acid with glycol is carried out under pressure and in the presence of water and an antimony or germanium compound. This process makes it possible to prepare colorless products in an economically advantageous manner. In all these pressure processes described above, however, the process stage of condensation subsequent to the transesterification is carried out under vacuum.

In spite of these known detailed measures, the process times used for the preparation of polyesters and alkyds in stirred kettles operated discontinuously are disproportionately long in comparison with the reaction times required by theory on the basis of known kinetic data for esterification reactions. This causes shortcomings in quality as the result of long exposure of the product to heat, and is also economically disadvantageous as a result of long reactor occupation times. If the condensation reaction is completed under vacuum, this causes additional shortcomings in quality as a result of the product being subjected to oxidation.

The invention was based on the object of developing a process for the discontinuous preparation of polyesters and alkyds which, in particular, permits shortened process times, does not require expensive technical alterations to existing reactors, is simple to control and affords products of a high and constant quality.

This object is achieved in accordance with the invention by a process for the preparation of polyester and alkyd resins from bifunctional and/or polyfunctional carboxylic acids and/or carboxylic anhydrides and/or carboxylic acid esters and from bifunctional and/or polyfunctional alcohols in which the reaction is carried out with the application of pressure in stirred kettle reactors which are operated discontinuously and equipped with rectifying columns. It is essential to the invention that 1. the reaction temperature is between 180° and 320° C.,
2. during the entire process an entraining agent is introduced into the reaction mixture below surface level by means of a delivery device in order to improve the transport of the products of the condensation reaction,
3. the condensation reaction is carried out under an absolute pressure between 1.5 and 10 bar which is kept constant until at least the time when the reaction rate is at the maximum (reaction phase I) and
4. the pressure is then reduced to atmospheric pressure at a gradient of −0.05 bar/hour to −5 bar/hour (reaction phase II), 5. the reaction is completed under normal pressure while the reaction temperature is kept constant and the admission of entraining agent into the reaction mixture and to the head of the column is maintained (reaction phase III).

The polycondensation process according to the invention has, in particular, the advantage that the process times for the preparation of polyester and alkyd resins can be markedly reduced, as a result of which the profitability of the process is considerably increased. Furthermore, in comparison with the vacuum procedure, the products are correspondingly less exposed to heat or oxidation and are therefore distinguished by more advantageous properties—in particular by reduced discoloration—compared with the products prepared by the conventional processes.

The usual synthesis components known per se, i.e. bifunctional and/or polyfunctional carboxylic acids or suitable derivatives, such as, for example, their anhydrides or alkyl esters, and bifunctional and/or polyfunctional alcohols are suitable for the preparation of the polyester and alkyd resins by the process according to the invention. The starting materials are employed in the customary ratios (cf., for example, Ullmanns Enzyklopädie der technischen Chemie ("Ullmann's Encyclopedia of Industrial Chemistry"), 4th Edition, Volume 19, Verlag Chemie, Weinheim, pages 61-88, and also the literature references indicated therein).

The process according to the invention is carried out in a stirred kettle reactor which is operated discontinuously, is equipped with a rectifying column, a condenser, a separation vessel, a receiver for condensation components produced, a pump for recycling entraining agent, if appropriate a vaporizer for entraining agent, a means of feeding entraining agent and an inert gas connection and can be heated and cooled. The heat required for the process can be supplied to the reactor either by electrical heating, high-pressure steam or a heating medium. The pressure of the system is adjusted in each case by means of a pressure-regulating unit using an inert gas, such as, for example, nitrogen. The individual elements of the stirred kettle reactor, such as the rectifying column, the separation vessel, the receiver and the like are in each case commercially available pieces of equipment suitable for the intended use.

One or more pumps, such as, for example, centrifugal or membrane pumps, in combination with flow regulators are employed to recycle the entraining agent to the head of the column and to feed the remaining amount of entraining agent into the reaction mixture. Examples of suitable inlet devices for the entraining agent below the surface of the reaction mixture are one or more dip tubes having a narrowed orifice. Care should be taken in the selection of the inlet device that good distribution of the entraining agent in the reaction mixture is ensured—if appropriate assisted by a stirrer.

The process according to the invention is carried out by initially placing the mixture of raw materials corresponding to the desired polyester in the stirred kettle reactor, together with an entraining agent. Suitable entraining agents are solvents or solvent mixtures which are not miscible with the condensation component, such as, for example, xylene or toluene, and which, although they may form a minimum azeotrope with the escaping condensation component, must not form a minimum azeotrope with the raw materials employed, in particular the polyols. The amount of entraining agent added is 0.5 to 10% by weight, preferably 2 to 4% by weight, in each case relative to the total weight of the starting materials. The most advantageous amount of entraining agent for the particular reaction to be carried out can, however, easily be determined by means of trials.

The next step is to bring the reaction equipment to an absolute system pressure of 1.5 to 10 bar, preferably 2 to 5 bar, by feeding in an inert gas and then to heat it as quickly as possible up to the particular reaction temperature. Depending on the starting compounds employed, the reaction temperature is between 180° and 320° C., preferably between 200° and 300° C. and very particularly preferably between 240° and 280°.

As a rule, the reaction temperature in the process according to the invention is above the temperature at which the reaction with the same components is usually carried out under atmospheric pressure.

When the reaction temperature is high enough for the reaction mixture to boil, the pump or pumps for the entraining agent is/are started. The entraining agent/condensation reaction product mixture which flows out of the condenser is separated in the separation vessel. The condensation product is discharged. The entraining agent is divided in such a way that at least the minimum reflux quantity required for a good separating action in the column is always fed to the head of the rectifying column. The remaining amount of entraining agent is fed to the reaction mixture. Compared with the customary operation of the column in azeotropic distillation using total reflux of entraining agent through the column, this division of the total amount of entraining agent supplied is to break the link between the liquid reflux rate through the column and the rate of flow of vapor ascending in the column. This has the effect of increasing the possible maximum vapor flows through the column, which are essentially limited by the liquid reflux in the column.

Although it is possible to introduce the entraining agent in liquid form into the reaction mixture, it is preferable to previously vaporize the entraining agent in a vaporizer, particularly if major amounts of entraining agent (such as are produced in the production of polyesters on an industrial scale) are recycled. A particularly preferred process variant is to heat the previously vaporized entraining agent to at least the temperature of the reaction mixture before it is introduced into the reactor. The entraining agent can be fed below the level of the surface of the reaction mixture by means of one or more nozzles, it being essential for increasing the mass transfer that the entraining agent should be thoroughly distributed in the reaction mixture by means of the inlet device - if appropriate assisted by means of a stirrer. It is therefore particularly advantageous to feed the entraining agent within the lower third of the stirred kettle.

The amount of entraining agent introduced into the reaction mixture is between 0.03 and 2 m$^3$/hour, preferably between 0.3 and 1 m$^3$/hour, of liquid entraining agent per m$^3$ of reaction mixture. In the course of the process the amount of entraining agent recycled is increased and the amount of condensation component, which decreases as conversion increases, is thereby replaced, so that the vapor velocity above the surface of the melt is kept at an approximately uniform level.

In order to achieve the best possible mass transfer, the amount of entraining agent introduced into the reaction mixture should be as great as possible. The maximum amount of entraining agent which can be recycled into the reaction mixture is, however, limited by the fact that it must remain possible to control the tendency of the reaction mixture to form foam. In addition, the maximum amount of entraining agent which can be recycled is limited by the maximum amount of entraining agent which can be vaporized within the reactor or within the preliminary vaporizer, and this amount can be influenced via the temperature of the reaction mixture and/or the temperature of the preliminary vaporizer.

The system pressure in the reaction equipment is kept at a constant value between 1.5 and 10 bar, preferably between 2 and 5 bar, at least until the maximum reaction velocity of the condensation reaction has been reached. This moment of maximum reaction velocity is determined by measuring the maximum rate at which the condensation component is obtained in the separation vessel.

Subsequent to this reaction phase I, the pressure is reduced to atmospheric pressure at a gradient of −0.05 bar/hour to −5 bar/hour (reaction phase II). It is a decisive factor in the process according to the invention that the process parameters pressure, reactor temperature, and amount of entraining agent recycled into the reaction mixture are so matched to one another that the resulting effective volume flows of vapor composed of released condensation component, entraining agent vapor and partially concomitantly vaporized feedstock above the surface of the melt in the reactor and particularly in the rectifying column are, on the one hand, as high as possible, but, on the other hand, are controllable by hydrodynamic means, i.e. that the carry-over of droplets can be controlled and the formation of foam can be controlled. This controllability is provided if the effective vapor velocity above the surface of the melt is between 0.1 and 100 cm/second, preferably between 0.5 and 20 cm/second. For rectifying columns containing ordered packings, for example metal fabric packings such as, for example, that of the rectifying column containing Sulzer BX type expanded metal packing, the effective vapor velocity in the rectifying column should be between 0.5 and 5 m/second, preferably between 1 and 3.5 m/second, at a suitably adjusted trickling density. If other rectifying columns are employed, the corresponding effective vapor velocities in the column should be determined by means of the characteristic data of the column.

Finally, during reaction phase III, the reaction is continued, under normal pressure and with the reaction temperature kept constant, while the feed of entraining agent into the reaction mixture and to the head of the column is maintained until the product exhibits the desired properties, such as acid number, OH number, viscosity and the like. The polyester resin is then worked up by the customary procedures.

The process according to the invention will now be exemplified by means of an illustrative embodiment. Unless otherwise indicated, % data are percentages by weight.

EXAMPLE 1

The following example describes the process according to the invention in terms of a polyester synthesis in a 100 liter reaction apparatus.

The reactor is equipped with a rectifying column containing Sulzer BX type expanded metal packing, a condenser, a separation vessel and a receiver for condensation reaction liquids obtained. A pump is employed for recycling entraining agent to the head of the column and for feeding the remaining amount of entraining agent into the reaction mixture. The absolute pressure in the reaction equipment can be adjusted to 2 bar by means of a pressure regulator.

16.7 kg of isononanoic acid, 21.8 kg of trimethylolpropane, 2.40 kg of xylene (entraining agent) and 23.8 kg of phthalic anhydride are initially placed in the reactor.

The absolute pressure in the reaction equipment is then adjusted to 2 bar by feeding in nitrogen gas. This pressure is kept constant by means of the pressure regulator during the synthesis until a conversion of approx. 67% has been reached (reaction phase I).

When the pressure has been regulated, the contents of the reactor are heated up to 260° C. with vigorous stirring at a rate of approx. 80° C./hour. After boiling starts at approx. 176° C., the entraining agent pump is started. The liquid mixture of water and entraining agent flowing out of the condenser is separated in the separation vessel. The water of reaction is discharged. It contains only very small amounts of organic constituents. After passing through the entraining agent pump, the entraining agent is divided so that the rectifying column is always charged with at least the minimum reflux rate. The amount of entraining agent available over and above this is fed to the reactor through a dip pipe equipped with a narrowed orifice—projecting into the resin melt. The circulation of the entraining agent increases as the reaction temperature rises, so that the amount of entraining agent fed into the melt can consequently be increased to approx. 30 l of xylene per hour.

When conversion is approx. 67% (3/4 hour after the maximum reaction velocity), the system pressure of the reaction equipment is reduced to atmospheric conditions at 8.0 mbar/minute (reaction phase II). The feed of entraining agent below the liquid level is, however, continued to the end of the reaction.

The reaction temperature is then kept at 260° C. under atmospheric pressure (reaction phase III) until the reaction product has an acid number of 17 mg of KOH/g (solid) and the viscosity of a sample incipiently dissolved in xylene (60% solids content) is 5.5 dPas at 23° C.

The contents of the reactor are then cooled to 200° C. and the pump for feeding entraining agent to the head of the column and adding it below the liquid level is shut down. The polyester resin is then worked up by the usual procedures.

The reaction time for the synthesis described, from the start of heating up until the characteristic data are reached at a product temperature of 260° C. after the completion of reaction phase III, is 4.5 hours.

COMPARISON EXAMPLE

A 100 liter reactor, as described in Example 1, is employed as the reaction equipment. The peripheral apparatus consists of a column, a condenser, a separation vessel, a receiver for reaction liquids obtained and a centrifugal pump for recycling the entraining agent to the head of the column. The reaction equipment is operated at atmospheric pressure.

Analogously to Example 1, 16.7 kg of isononanoic acid, 21.8 kg of trimethylolpropane, 2.40 kg of xylene (entraining agent) and 23.8 kg of phthalic anhydride are weighed into the reactor. The reactor temperature is then increased from 30° C. to 220° C. in the course of 5 hours. More rapid heating up or synthesis temperatures higher than 220° C. result immediately in foaming of the contents of the reactor and hence to clogging of the column and exit gas channels. The reaction begins at a reactor temperature of approx. 166° C. Analogously to Example 1, the entraining agent/water mixture flowing out of the condenser is separated in the separation vessel and the water of reaction is discharged. The whole of the entraining agent, approx. 5 liters/hour, is recycled to the head of the column. The product temperature is kept at 220° C. until the reaction product exhibits an acid number of 17 mg of KOH/g (solid) and the viscosity of a sample incipiently dissolved in xylene (60% solids content) is 5.5 dPas at 23° C. When the column head feed pump has been shut down, the reaction contents are cooled to 200° C. and worked up by the customary procedures. The reaction time of the synthesis described, from the start of heating up until the characteristic data are reached at 220° C. is 11 hours.

We claim:

1. Process for the preparation of polyester and alkyd resins from bifunctional and/or polyfunctional carboxylic acids and/or carboxylic anhydrides and/or carboxylic acid esters and from bifunctional and/or polyfunctional alcohols, in which the reaction is carried out with the application of pressure in stirred kettle reactors which are operated discontinuously and equipped with rectifying columns, wherein
   A) the reaction temperature is between 180° and 320° C.
   B) during the entire process an entraining agent is introduced into the reaction mixture below surface level by means of a delivery device in order to improve the transport of the products of the condensation reaction,
   C) the condensation reaction is carried out under an absolute pressure between 1.5 and 10 bar which is kept constant until at least the time when the reaction rate is at the maximum (reaction phase I) and
   D) the pressure is then reduced to atmospheric pressure at a gradient of $-0.05$ bar/hour to $-5$ bar/hour (reaction phase II),
   E) the reaction is completed under normal pressure while the reaction temperature is kept constant and the admission of entraining agent into the reaction mixture and to the head of the column is maintained (reaction phase III).

2. Process as claimed in claim 1, wherein the entraining agent is previously vaporized in a vaporizer before being introduced into the reactor.

3. Process as claimed in claim 2, wherein the previously vaporized entraining agent is heated to at least the reaction temperature of the melt before being introduced into the reactor.

4. Process as claimed in claim 1, wherein the entraining agent is fed within the lower third of the stirred kettle.

5. Process as claimed in claim 1, wherein the reaction phase I of the condensation reaction is carried out under an absolute pressure of 2 to 5 bar.

6. Process as claimed in claim 1, wherein the reaction temperature is between 200° and 300° C.

7. Process as claimed in claim 1, wherein the reaction temperature is between 240° and 280° C.

* * * * *